Jan. 6, 1953     R. A. HERRING, JR     2,624,851
PULSE GENERATOR
Filed Sept. 21, 1951     2 SHEETS—SHEET 1
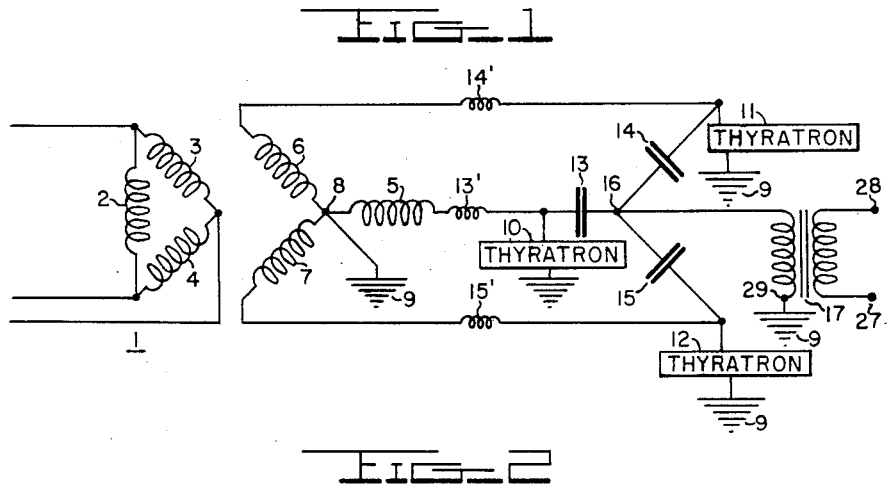
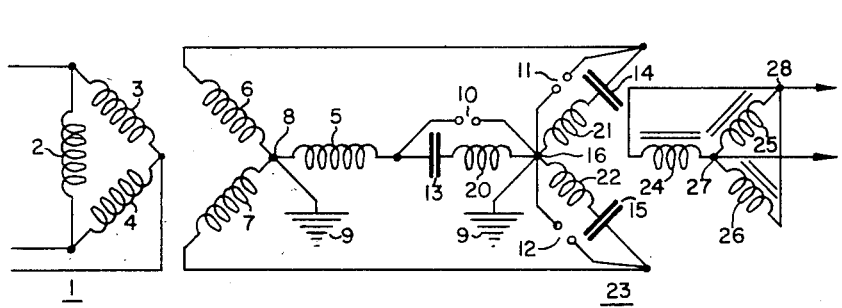
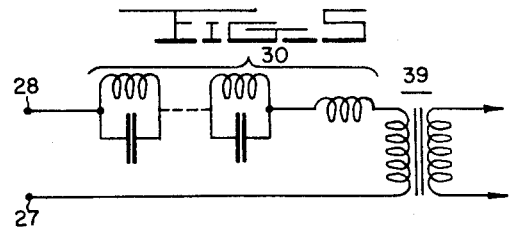
INVENTOR
ROBERT. A. HERRING JR.
BY
ATTORNEYS

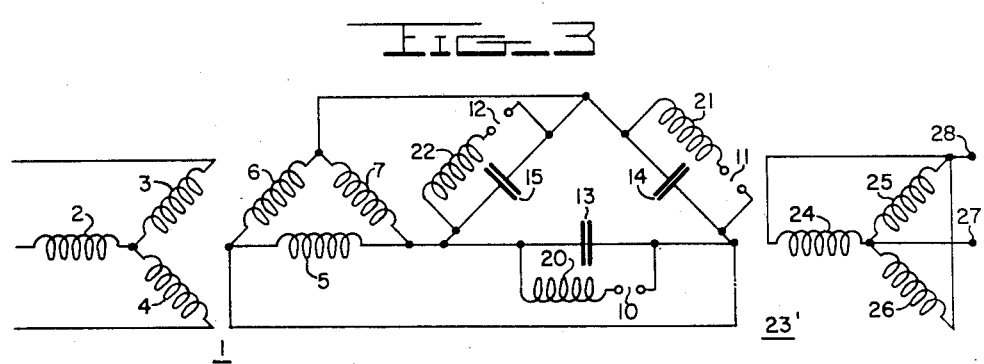
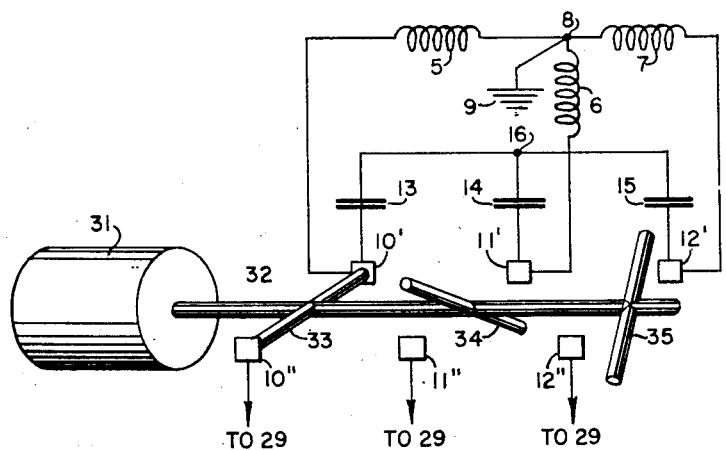

Patented Jan. 6, 1953

2,624,851

UNITED STATES PATENT OFFICE 2,624,851

PULSE GENERATOR

Robert A. Herring, Jr., Washington, D. C.

Application September 21, 1951, Serial No. 247,740

17 Claims. (Cl. 307—108)

(Granted under Title 35, U. S. Code (1952), sec. 266)

This invention relates to a means for converting a polyphase A. C. power supply source of a basic frequency into a pulse type output having a frequency equal to the number of phases in the supply source times the basic frequency, and is particularly adapted for use as a modulator for pulsing a magnetron or other suitable load circuit.

Since high power pulses are used frequently in many commercial applications, for example magnetron operation, the power source employed is generally polyphase. While A. C. charging is commonly used with single phase line type pulser systems, the utilization of a polyphase source such as is necessary in high power applications precludes the use of conventional A. C. charging systems used in single phase systems. Furthermore, the present A. C. single phase charging line type pulser cannot be run at any desired multiple of the source frequency. The frequencies obtainable from the single phase A. C. line type pulser are limited to the source frequency, double the source frequency and sub-multiples of the source frequency. A D. C. charging line type pulser has also been provided for solving this problem, but this type of pulser is quite bulky since it requires the use of rectifiers and filters. A hard tube pulser, such as disclosed in the Dean Patent No. 2,435,958, has been devised to use polyphase A. C. voltage to control a high frequency pulse type power output. However, this type and other types of hard tube pulsers do not convert polyphase A. C. power into a pulse type power output. In addition, they are very cumbersome since they require a large size housing unit, are comparatively heavy, and require the use of large vacuum tubes for the last stages of amplification required to attain the required voltages and power.

Accordingly, it is an object of this invention to provide a line type pulser capable of converting polyphase A. C. power having the frequency of ordinary power line circuits into a high voltage pulse output having a high frequency, of uniform voltage and duration and separated by a uniform time interval.

Another object is to provide a line type pulser capable of converting polyphase A. C. power of a basic frequency into a pulse type output having a frequency equal to the number of phases times the basic frequency which is also capable of forming a pulse type output having a frequency that is a submultiple of the number of phases times the basic frequency.

It is another object to provide a line type pulsing unit for the purpose described hereinabove which is light and compact compared to present type units.

Another object of this invention is to provide a pulsing unit capable of operating with high power A. C. sources to provide a high voltage output pulse without the necessity of having a multiplicity of amplification stages.

It is a further object of this invention to provide a line type pulser capable of operating with polyphase A. C. sources that is of simple design and is relatively easy and inexpensive to manufacture.

Another object of this invention is to provide a line type pulser that is capable of utilizing each of the phases of a polyphase A. C. supply independently of each other if it is desired to pulse a plurality of output circuits at the same frequency or at different frequencies.

Other objects of the invention will be apparent from a consideration of the following disclosure taken in connection with the drawings wherein:

Figure 1 is a schematic diagram of the circuit of one embodiment of my invention.

Figure 2 is a schematic diagram of the circuit of another embodiment of my invention.

Figure 3 is a schematic diagram of the circuit of still another embodiment of my invention.

Figure 4 shows a perspective view of a mechanically operated switching device adapted to be used with any of the embodiments shown, but shown in particular as used in the embodiment of Figure 1.

Figure 5 shows a device used to shape the output pulse in conjunction with the elements included in each of the modifications shown.

The present invention visualizes the use of a polyphase transformer, the primary of which is used to receive the various phases from a polyphase A. C. source in the various primary branches. The secondary branches each contain an electrical energy storage device, a discharge switch and some charging inductance in series with the secondary of the transformer and the storage device. The switch can be tripped at any predetermined point in the phase of the voltage built up on the storage device in that branch. The pulses formed in each branch may then be fed into a common line, thereby producing a pulse energy output having a frequency that is a multiple of the basic frequency of the polyphase A. C. source.

In the embodiment depicted in Figure 1, reference number 1 designates a polyphase transformer having either polygonal or star-connected primary branches comprising windings 2, 3, and 4 and preferably star-connected secondary branches comprising windings 5, 6, and 7. A delta-type primary and Y-type secondary are illustrated for simplicity. While a three phase transformer is disclosed, it is understood that this type is described in order to simplify the illustration and that a polyphase transformer embodying any number of phases may work equally well. The secondary windings are coupled to common terminal 8 which is preferably but not necessarily coupled to ground 9 or to point 29. The terminals of switches 10, 11 and 12 which are depicted as grounded should be connected to the primary of transformer 17 at point 29 either via ground, as shown, or directly. Elements 13, 14, and 15 are disclosed as condensers for the sake of simplicity. Actually, they may be pure condensers or pulse forming networks of any description, the capacity of which is chosen to provide a desired energy content in the output pulses. Elements 13, 14, and 15 are identical and are coupled to the terminals of switches 10, 11, and 12 which are opposite the switch terminals coupled to common terminal 8. Each of these elements are coupled to a different one of the secondary windings of transformer 1 and also to common terminal 16 which may be coupled directly to a load line or to a pulse transformer 17 which may have its secondary coupled to the load line at terminals 27 and 28.

Switches 10, 11, and 12 are identical in structure and may be any well known switching device such as the thyratrons shown in Figure 1 or the spark gaps shown in Figure 2. Even a set of mechanically operated switches such as shown in Figure 4 and described in further detail below would suffice, provided they each operate at a predetermined phase of the voltage formed on condensers 13, 14, and 15 respectively. While the thyratrons are shown in use with the first embodiment and the spark gaps with the second embodiment, it is understood that any type of switch may be utilized with either embodiment of the invention.

The modification of Figure 2 is similar to that of Figure 1 except that windings 20, 21, and 22 are coupled in series to condensers 13, 14, and 15 respectively, discharging switches 10, 11, and 12 are coupled in parallel across inductance-capacitance couplings 13, 20 and 14, 21 and 15, 22, respectively, and terminals 8 and 16 are preferably but not necessarily coupled, either directly or via ground 9. Windings 20, 21, and 22 may be in series with the switches rather than the condensers. Also the device of Figure 2 envisions the use of windings 20, 21, and 22 as primary coils of a multi-winding pulse transformer 23 having secondary windings 24, 25, and 26 coupled at terminals 27 and 28 either directly to the load or to a pulse transformer 39 either directly or via a pulse shaper 30, such as shown in Figure 5.

The operation of the pulsers disclosed is simple. For example, 60 cycle polyphase voltage is applied across the branches 2, 3, and 4 of transformer 1 inducing voltages in secondary coils 5, 6, and 7. These induced voltages are impressed across condensers 13, 14, and 15. Switches 10, 11, and 12 are designed to discharge the condensers at any desired time in the charging cycle in sequence at a desired phase of the charging cycle, preferably when their associated condensers are charged to maximum energy. The timing may be accomplished by the use of simple peaking transformers placed in either the primary or secondary of transformer 1 and arranged to trigger the switches at the desired phase of the charge on the condenser, or the drop across a resistor similarly placed could be used, etc. As stated above, elements 13, 14, and 15 may be networks designed to generate specified shapes of impulse rather than capacitors.

The operation of one branch in the secondary is typical of the charging operation of the various circuits. For example, voltage induced in secondary winding 5 causes energy to be stored in condenser 13 until it is discharged through switch 10 at some predetermined phase of the charging cycle via ground and across the primary of transformer 17 or the load to be pulsed. Sequentially, at 120 degrees phase difference, discharges occur through switches 11 and 12. As the switches discharge the elements 13, 14, and 15 in sequence, pulses are impressed on terminal 16 which may be connected directly to the load or coupled via a pulse transformer 17 to the load.

Elements 13, 14, and 15 are chosen to have a capacitance required to supply a desired energy content in the output pulses.

Each of the secondary branches has an inherent charging inductance due to leakage inductance of transformer 1 which may be increased by the addition of additional inductances 13′, 14′, and 15′ to tune the individual circuits to adjust their natural frequencies to have any desired relation to the frequency of the power source. For the sake of simplicity, inductances 13′, 14′, and 15′ are shown only in Figure 1, but it is understood that they also may be present in the other embodiments.

The variation embodied in Figure 2 operates in a manner similar to the species of Figure 1. The operation of transformer 1 is identical to that described for the species of Figure 1. However, the successive excitation of switches 10, 11, and 12 produces successive pulses in associated identical coils 20, 21, and 22, respectively. These coils operate as the primaries of multi-winding pulse transformer 23 and excite secondary coils 24, 25, and 26 which are tied in parallel. The pulses induced in the secondary coils are fed successively across terminals 27 and 28, which may be coupled directly to the load as shown in Figure 2 or coupled to a single phase transformer 39 such as shown in Figure 5. The use of a pulse shaper 30, shown in Figure 5, is designed to be used in conjunction with elements 13, 14, and 15 in order to shape the output pulses as desired. The pulse shaper 30 may be connected directly between the secondary of transformer 23 and the load in the embodiment of Figure 2 or in either the primary or secondary of transformer 17 in the embodiment of Figure 1.

In the modification embodied in Figure 3, storage elements 13, 14, and 15 are shown as polygonally connected rather than star-connected as shown in Figure 2. Moreover, while windings 20, 21, and 22 are shown to be in series with switches 10, 11, and 12 in the drawing, they may be arranged in parallel with the respective switches and in series with elements 13, 14, and 15 respectively as disclosed in the star-connected embodiment of Figure 2. Windings 2, 3, and 4 are shown as star-connected in this embodiment, but this type of connection of the windings is not critical.

The operation of this type of circuit is slightly different from the operation of the other circuits. Here, the voltages built up across the condensers are the result of the vectorial sum of the voltages induced in windings 5, 6, and 7 that are applied across each individual condenser. For example, the voltage build-up across condenser 13 is the vectorial sum of the voltage due to that induced in windings 5 plus the resultant voltage at that instant due to the voltage induced in the parallel branch of this charging circuit comprising windings 6 and 7. When the charge on element 13 reaches a predetermined level, switch 10 is fired. Pulse transformer 23' operates in a manner similar to that disclosed for transformer 23 above.

Although it has been stated that switches 10, 11, and 12 may be thyratrons or spark gaps, it is also feasible to employ a series of mechanically controlled switches such as shown in Figure 4. The use of a synchronous motor 31 to drive an axle 32 is envisioned. Arms 33, 34, and 35 radiate from axle 32 and are oriented so that each arm radiates at an angle of 60° with respect to the other two arms. The angle of orientation and the number of arms used depends on the number of phases contained in the A. C. power source. The motor is driven to rotate the axle one-half cycle for each cycle of the A. C. power supply source. Arm 33 causes electrical connection between terminals 10' and 10" thereby closing switch 10 at a predetermined phase in the charging cycle of element 13. Successively, when elements 14 and 15 are charged, arms 34 and 35 cause successive electrical connections between terminals 11' and 11" and 12' and 12" respectively. It is noted that the power generated is so high that an actual physical connection is unnecessary. All that is needed is that the arms come close enough to the terminals of switches 10, 11, and 12 for an arc to be formed. The rotational velocity of the shaft 32 may be synchronized to the cycles of the A. C. power source by means of a reduction gear or any other well known expedient.

While all the embodiments disclose the use of a transformer 1 as an integral part of the invention, it is understood that the polyphase power needed to derive the pulse output may be obtained directly from any polyphase A. C. power source.

Should it be desired to pulse a plurality of loads, the species of Figure 2 or Figure 3 may be utilized by impressing the pulsed voltage output from secondary coils 24, 25, and 26 across separate loads.

The invention described herein may be manufactured and used by or for the Government of the United States of America for governmental purposes without the payment of any royalties thereon or therefor.

What is claimed is:

1. In a power generation circuit including a polyphase alternating current power source, a pulse generator for converting the alternating current supply into a source of substantially unipolar energy pulses comprising a separate electrical energy storage means for each phase of the polyphase source, a charging circuit connection for coupling each of said electrical energy storage means to a respective phase of the polyphase source thereby providing a path to sequentially charge said storage means, a common output circuit coupled to all of said storage means, and a separate low impedance discharge circuit means coupled to each of said storage means operative to sequentially discharge each of said storage means through said common output circuit.

2. In a power generation circuit including a polyphase alternating current power source, a pulse generator for converting the alternating current supply into a source of substantially unipolar energy pulses having a frequency that bears a fixed ratio to that of the alternating power source comprising a separate electrical energy storage means for each phase of the polyphase source, a charging circuit connection for coupling each of said electrical energy storage means to a respective phase of the polyphase source thereby providing a path to sequentially charge said storage means, a common output circuit coupled to all of said storage means, and a separate low impedance discharge circuit means coupled to each of said storage means operative to sequentially discharge each of said storage means at the polyphase frequency rate through said common output circuit.

3. A device of the type described in claim 1 wherein an inductance is associated with each electrical energy storage means, thereby enabling the amount of electrical energy that can be stored in said storage means to be increased for any fixed amount of source voltage.

4. A line type pulser as claimed in claim 1 wherein the said common output circuit comprises a terminal coupled to all the electrical energy storage devices, and a load line coupled to said terminal.

5. A line type pulser of the type claimed in claim 1 wherein each separate electric energy storage means consists of a condenser.

6. A line type pulser of the type claimed in claim 1 wherein a pulse shaper is coupled to the pulser in order to form output pulses of a desired shape.

7. A line type pulser of the type claimed in claim 1 wherein the electric energy storage means comprises an inductance-capacitance coupling and the associated discharging means is connected in shunt across said coupling.

8. A line type pulser as claimed in claim 7 wherein a pulse shaper is coupled to the pulser in order to form pulse output of a desired shape.

9. A line type pulser as claimed in claim 1 wherein the electric storage means are polygonally coupled.

10. A line type pulser as claimed in claim 1 wherein the discharging means coupled to each branch is a thyratron.

11. A line type pulser as claimed in claim 1 wherein the discharging means coupled to each branch is a spark gap.

12. A line type pulser as claimed in claim 1 wherein the discharging means coupled to each branch is a mechanically controlled switch operated in synchronism with the basic frequency of the associated phase of the polyphase A. C. supply source.

13. A line type pulser for converting a polyphase A. C. supply source of a basic frequency to a substantially unipolar pulse type output having a frequency equal to a multiple of the basic frequency comprising, a polyphase transformer containing a set of primary windings and a single set of secondary windings, the windings in the secondary set being joined at one end, a single electric energy storage means coupled to each of the secondary windings, a discharging switch coupled to each of the secondary windings, said switches being so triggered as to discharge in succession when the amount of electric energy stored in each coupled storage means reaches a predetermined level, whereby a number of pulses equal to the number of secondary windings are formed for each cycle of the basic frequency, and means to combine these pulses in an output circuit.

14. A line type pulser for converting a polyphase A. C. supply source of a basic frequency to a substantially unipolar pulse type output having a frequency equal to a harmonic of the basic frequency comprising, a polyphase transformer containing a set of primary windings and a single set of secondary windings, the windings in the secondary set being joined and grounded at one end, a single electric energy storage means coupled to each of the secondary windings, a grounded discharging switch coupled to each of the secondary windings, said switches being so triggered as to discharge in succession when the amount of electric energy stored in each coupled storage means reaches a predetermined level, whereby a number of pulses equal to the number of secondary windings are formed for each cycle of the basic frequency, and means to combine these pulses in an output circuit.

15. In a voltage pulser circuit comprising a polyphase voltage source, the combination of a set of electric energy storage devices, a single separate electrical energy storage device coupled to each phase of said source, a set of discharging means adapted to be triggered at a predetermined voltage, a common terminal connected to each storage device, a load line connected to said common terminal, a separate discharging means series coupled between each storage device and the load line at points opposite their connections to said common terminal and adapted to pulse the latter whenever the voltage developed across its associated storage device reaches the amount necessary to trigger its coupled discharging means.

16. In a voltage pulser circuit consisting of a polyphase voltage source, the combination of a set of electrical energy storage means, a set of inductances and a set of switches, a single means, inductance and switch of each set comprising a branch coupled to each phase of said polyphase voltage means. a common output terminal coupled to each branch, a load line coupled to said output terminal, each inductance adapted to increase the voltage developed across said electrical energy storage means, each switch being series coupled between its associated storage means and said load line, said switches being adapted to be triggered at a predetermined voltage, whereby a voltage pulse appears at the common terminal whenever the voltage in any branch equals the triggering voltage of its associated switch.

17. In a voltage pulser circuit comprising a polyphase voltage source, the combination of a set of polygonally connected electrical energy storage elements, a set of discharging switches, a single storage element and a single switch being coupled to each phase of said polyphase voltage source, each single switch adapted to be triggered at a predetermined voltage, a load line coupled to said storage elements and switches and adapted to be pulsed whenever each single switch is triggered.

ROBERT A. HERRING, Jr.

REFERENCES CITED

The following references are of record in the file of this patent:

UNITED STATES PATENTS

| Number | Name | Date |
|---|---|---|
| 2,078,151 | Miles | Apr. 20, 1937 |
| 2,481,132 | Lissman | Sept. 6, 1949 |

FOREIGN PATENTS

| Number | Country | Date |
|---|---|---|
| 604,059 | Great Britain | June 28, 1948 |